(12) United States Patent
Ahmed

(10) Patent No.: US 10,646,072 B2
(45) Date of Patent: May 12, 2020

(54) ZONAL BARBECUE GRILL WITH CARRYOVER PROVISION

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

(*) Notice: Subject to any disclaimer, the term of this patent is extended or adjusted under 35 U.S.C. 154(b) by 224 days.

(21) Appl. No.: 15/703,452

(22) Filed: Sep. 13, 2017

(65) Prior Publication Data

US 2018/0070770 A1 Mar. 15, 2018

Related U.S. Application Data

(60) Provisional application No. 62/393,983, filed on Sep. 13, 2016.

(51) Int. Cl.
*F24C 3/00* (2006.01)
*A47J 37/07* (2006.01)
*F23D 14/70* (2006.01)

(52) U.S. Cl.
CPC .......... *A47J 37/0713* (2013.01); *F23D 14/70* (2013.01); *F23D 2203/1012* (2013.01)

(58) Field of Classification Search
CPC ..................................................... F24C 3/106

USPC ....... 126/25 R, 29, 39 R, 39 E; 431/191–194
See application file for complete search history.

(56) References Cited

U.S. PATENT DOCUMENTS

| 2,654,359 | A | * | 10/1953 | Reeves | ................... F24C 3/106 |
| | | | | | 126/214 C |
| 4,715,356 | A | * | 12/1987 | Reynolds | ................ F24C 3/067 |
| | | | | | 126/214 R |
| 8,875,622 | B2 | | 11/2014 | Chung | |
| 2009/0165778 | A1 | | 7/2009 | Harter et al. | |
| 2013/0087136 | A1 | * | 4/2013 | Ahmed | ............... A47J 37/0682 |
| | | | | | 126/39 E |
| 2015/0013663 | A1 | | 1/2015 | Parrish | |
| 2016/0069564 | A1 | | 3/2016 | Ahmed | |

FOREIGN PATENT DOCUMENTS

| WO | 2010065155 A1 | 6/2010 |
| WO | PCT/US17/051395 | 11/2017 |

* cited by examiner

*Primary Examiner* — Vivek K Shirsat
(74) *Attorney, Agent, or Firm* — David G. Woodral; GableGotwals

(57) ABSTRACT

A cooking grill having a cooking grate, a plurality of gas burners arranged below the cooking grate, and at least one baffle between adjacent ones of the plurality of gas burners having an apex proximate the cooking grate and having a pair of opposite spaced apart walls extending downwardly at least to a level of the plurality of gas burners.

19 Claims, 5 Drawing Sheets

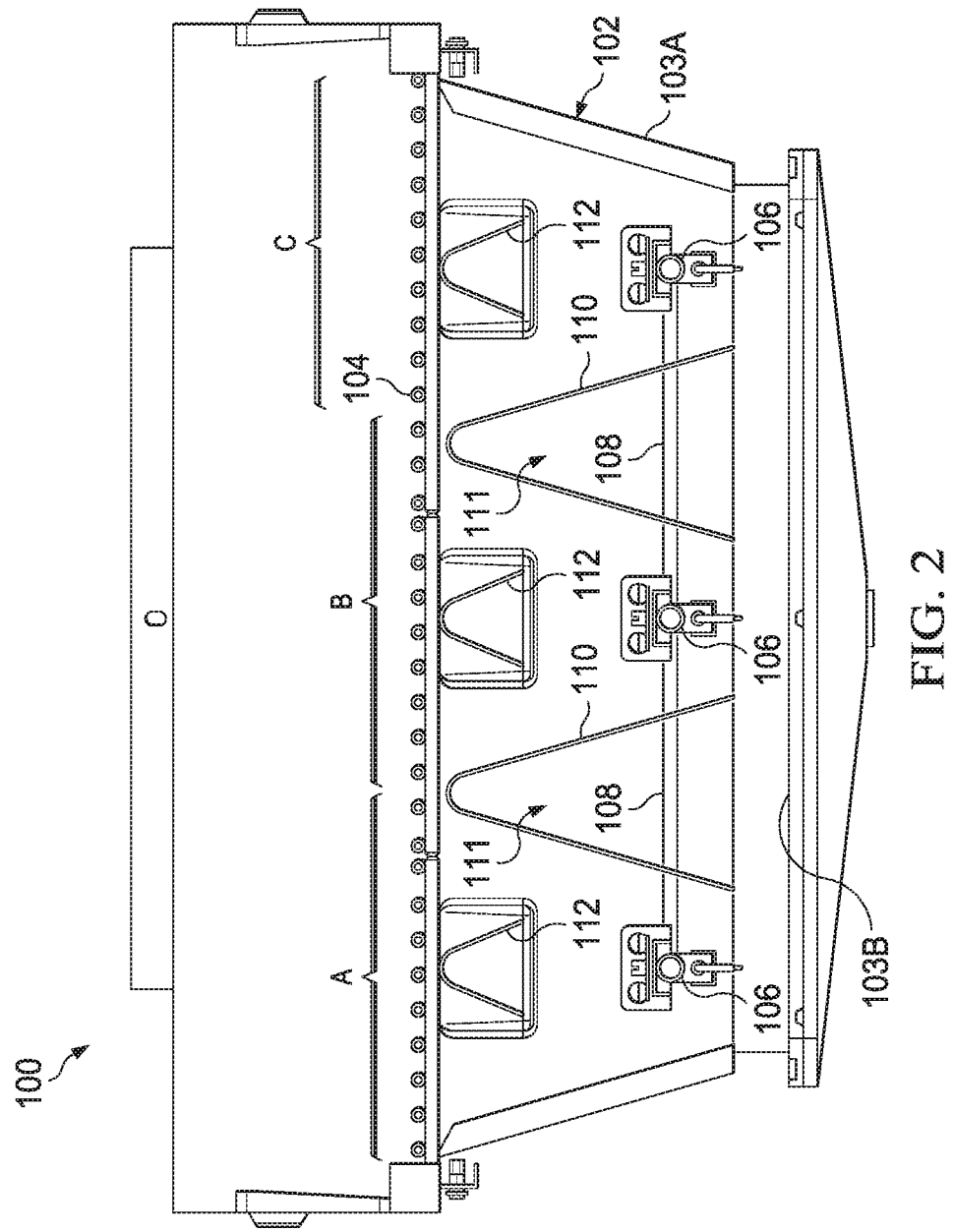

ZONAL BARBECUE GRILL WITH CARRYOVER PROVISION

CROSS-REFERENCE TO RELATED CASES

This application claims the benefit of U.S. provisional patent application Ser. No. 62/393,983, filed on Sep. 13, 2016, and incorporates such provisional application by reference into this disclosure as if fully set out at this point.

FIELD OF THE INVENTION

This disclosure relates to cooking grills in general and, more particularly, to a multi-zonal gas cooking grill.

BACKGROUND OF THE INVENTION

Gas fired barbecue grills often have multiple tube-like burners arranged in a front to back direction across the width of a firebox. The firebox commonly contains the burners as well as burner shielding and heat manipulation devices, all under a cooking grate. Multiple burners may be provided with individual gas valves for control of gas flow into the burners. Respective valves can be set to provide different flow into adjacent burners, which at least in theory allows variable heat across the cooking grate above the burners. However, the effectiveness of such variable heating is limited as all the burners are in a common open space below the burner shielding and heat manipulation devices.

Gas carryover tubes may be placed in the common open space between adjacent burners to allow ignition of one burner to lead to ignition of other burners. These carryover tubes are linear elements formed with a more or less enclosed tubular section smaller in area than the burners which are being connected with a provision to allow burning along the length of the tube at a relatively low rate. Examples of this type of device can be found to be described in US Patent Application Publication No. 2016/0069564 A1 and US Patent Application Publication No. 2015/0013663, both incorporated herein by reference.

Grills have been built with primitive dividers between the burners or have been built with separate box-like structures comprising individual fireboxes for each burner. In such case, the dividers or vertical structures, which must of necessity extend up to close proximity to the cooking grates, are vertical in nature. In the case shown in U.S. Pat. No. 8,985,092, incorporated herein by reference, there are upwardly opening v-shaped box-like structures formed around each burner. In the case with the v-shaped structure formed around each burner, efficiency and speed of heating is improved by the reduced volume and surface area to be heated by each burner. With structures such as that of U.S. Pat. No. 8,985,092, each burner is individually lit at an ignition point on the burner. In such case, the carryover tubes commonly used on fireboxes without dividers or box-like structures are not present.

The lack of a carryover tube carries with it certain disadvantages. One such disadvantage is that the failure of ignition components at an individual burner makes it quite difficult to light the burner without using cumbersome and inconvenient manual lighting (e.g., with a match or some such device). Another disadvantage is that in the event that flame is lost at one burner due to a gust of wind or other disturbance there is no automatic re-ignition by flame carryover from adjacent burners that are still burning. A user might then not be aware that the burner is no longer supplying heat to the cooking surface.

What is needed is a system and method for addressing the above and related issues.

SUMMARY OF THE INVENTION

The invention of the present disclosure, in one aspect thereof, comprises a cooking grill having a cooking grate, a plurality of gas burners arranged below the cooking grate, and at least one baffle between adjacent ones of the plurality of gas burners having an apex proximate the cooking grate and having a pair of opposite spaced apart walls extending downwardly at least to a level of the plurality of gas burners.

The grill may comprise at least one carryover tube passing through the at least one baffle to operationally connect the adjacent ones of the plurality of gas burners. The at least one baffle may extend to a floor of a firebox containing the gas burners and supporting the cooking grate. The at least one baffle may defines a plurality of independent cooking zones on the cooking grate, the plurality of zones being demarcated by the apex of the at least one baffle and each cooking zone being substantially functionally isolated from heat produced by a burner associated with the adjacent zone. In another embodiment it is a plurality of baffles that define a plurality of independent cooking zones on the cooking grate, the plurality of zones being demarcated by the apices of the plurality of baffles, and each cooking zone being substantially functionally isolated from heat produced by a burner associated with the adjacent zone.

The baffle or baffles may be arranged to run front to back below the cooking grate such that the cooking grate is divided into cooking zones that are arranged side by side on the cooking grate. The plurality of burners may comprise a plurality of tubular burners running front to back below the cooking grate. In some embodiments, a diffuser is positioned over one or more of the plurality of burners to spread convective heat across the cooking grate. Such diffusers may comprise a perforated or solid plate, possibly having an inverted-V cross section.

The invention of the present disclosure, in another aspect thereof, comprises a cooking grill with a firebox having a plurality of burner tubes oriented front-to-back within the firebox and a cooking grate supported above the burner tubes. The grill has at least one thermally isolating baffle between a pair of adjacent burner tubes running front-to-back within the firebox and extending from a lower lever that is at least as low as the adjacent pair of burner tubes to an upper level proximate the cooking grate. A passage defined through the at least one thermally isolating baffle. The grill has a carryover tube connecting the pair of adjacent burners and providing for flame carryover therebetween, the carryover tube passing through the passage defined through the at least one thermally isolating baffle.

In some embodiments, the at least one thermally isolating baffle extends to a floor of the firebox below the plurality of burner tubes. The baffle may comprise a panel having an inverted-V shape with an apex proximate the cooking grate and spaced apart legs extending below the plurality of burner tubes. In another embodiment, the baffle comprises a pair of radiused sidewalls joining at a vertex proximate the cooking grate and extending apart below the plurality of burner tubes. In a further embodiment, the baffle comprises a pair of vertical, spaced apart side walls extended to the firebox below the burner tubes and an upper inverted-V section with an apex proximate the cooking grate. A plurality of diffusers may be placed running front to back above one of the plurality of burner tubes, respectively.

The invention of the present disclosure, in another aspect thereof, comprises a method including providing a cooking grill having a firebox and a cooking grate situated proximate a top of the firebox. The method includes providing a plurality of tubular gas burners within the firebox and providing a thermally isolating baffle between two adjacent ones of the plurality of tubular gas burners. According to the method a passageway is defined through the thermally isolating baffle. A carryover tube is provided to transport flame between the two adjacent gas burners.

The method may further comprise forming the thermally isolating baffle as a pair of spaced apart walls. The method may include arranging the thermally isolating baffle to extend from below the plurality of tubular gas burners to proximate the cooking grate. The thermally isolating baffle may be formed as an inverted V with an apex proximate the cooking grate. In some cases the method further comprises providing a diffuser below the cooking grate and above one of the plurality of tubular gas burners.

BRIEF DESCRIPTION OF THE DRAWINGS

FIG. 2 is a front partial cutaway plan view of the grill of FIG. 1.

DETAILED DESCRIPTION OF THE PREFERRED EMBODIMENTS

Figure 1:
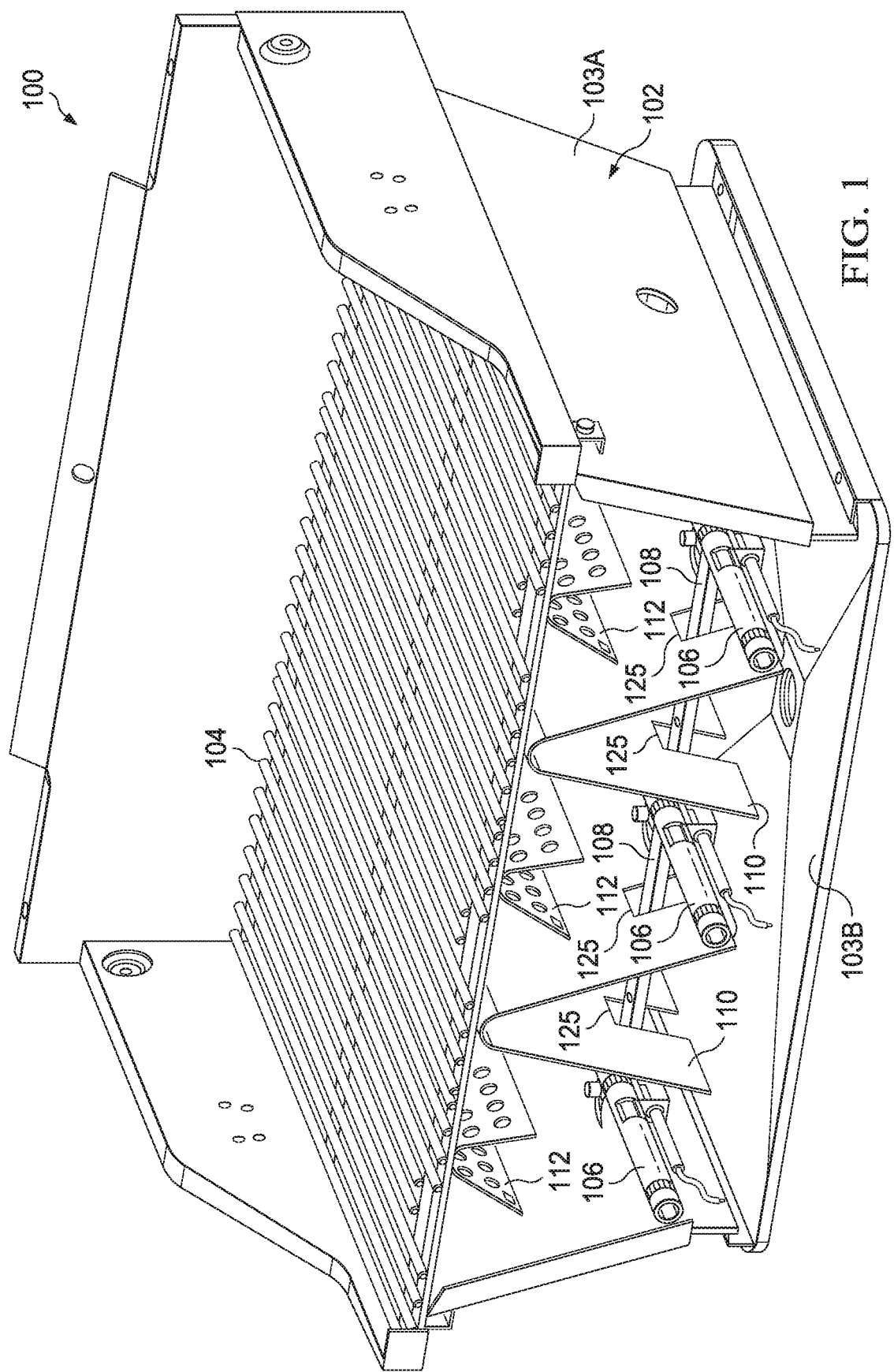
FIG. 1 is a perspective partial cutaway view of a grill according to aspects of the present disclosure.

Referring now to FIGS. 1-2, a grill according to aspects of the present disclosure is shown. The grill 100 is shown as a partial cutaway with a front-most portion of a firebox 102 removed to illustrate interior components. For clarity, certain other components are not illustrated (e.g., gas controls and a lid). The firebox 102 may be somewhat rectilinear in shape (although other shapes are possible). The firebox 102 may comprise sidewalls 103A extending upward from a base or floor 103B, which is not necessarily perfectly level (and may be sloped to promote drainage). The firebox 102 may comprises sheet metal or another suitably heat-resistant material.

Within the firebox 102, possibly supported at or near an upper level of the firebox 102, is a cooking grate 104. The cooking grate 104 may comprise a series of ribs for supporting food items during cooking. The cooking grate 104 may comprise cast iron, ceramic coated steel, and/or other materials.

Below the cooking grate 104 is a plurality of burners 106. In this embodiment, the burners 106 comprise three tubular burners running front to back in the firebox 102. Other embodiments may have more or fewer burners 106. In the present embodiments, the burners 106 are oriented in what would be considered a front-to-back orientation such that cooking zones (as explained below) are arranged from side to side along the cooking grate 104 for ease of access and operation.

A plurality of inverted V-shaped baffles 110 may be fitted into the firebox 102 below the cooking grate 104. The baffles 110 may have a vertex or apex at a top of the baffle proximate the cooking grate 104. Opposite lower edges of the baffle may be situated close to, or on, the bottom 103B of the firebox 102, and may terminate at a level below the burners 106. This configuration substantially impedes heat from each burner 106 from moving into the space in which each adjacent burner operates. In the illustrated embodiment, the baffles 110 divide the cooking grate 104 into three operational zones, A, B, and C (FIG. 2). This is accomplished with the use of two baffles 110 but a greater (or lesser) number of baffles could be used to provide more (or fewer) zones.

The baffles 110 are thermally isolating with respect to adjacent burners 106. The baffles block convective heat flow and a great deal of radiative heat from the burners 106. The effect of this configuration is that, for example, the burner 106 of zone A can have little effect on the cooking temperature of zone B, and vice versa. Therefore by independently controlling each of the burners 106, the cooking temperatures of zone A, B, and C may be separately selected and maintained. The baffles 106 may be constructed from sheet metal or another suitably heat-resistant material.

The burners 106 are interconnected with carryover tubes 108 for carrying ignition flame between adjacent burners 106 even though the burners 106 are thermally isolated from one another. Holes, ports, or openings 125 are defined in the walls of the baffles 110 to pass the carryover tubes 108 while allowing the baffles 110 to extend deeply into the firebox 102, even below the burner tubes 106. The openings 125 serve to define passageways through the baffles 110 for the carryover tubes 108. In one embodiment, the openings 125 are notches in the lower sidewalls of baffles 110 allowing the carryover tubes 108 to pass through laterally while the remainder of the side wall extend as low as the floor 103B of the firebox 102.

It may be observed that the baffles 110 each define an interior protected zone 111 (e.g., protected from wind, drippings, etc.). By having the carryover tube 108 pass inside the inverted V baffle 110 the flame that continually burns along the carryover tube when adjacent burners 106 are operative is protected from the effects of gusts of wind or sudden drops of the lid mounted on the firebox 102. Even if the flame of an adjacent burner is blown out, it has been observed that the burners 106 will be promptly re-lit by the flame which has been protected inside the inverted V baffle 110 (that is, inside the protected zone 111). Observation dictates that this configuration provides better recovery from blowout events as described above than a carryover tube alone.

The discrete baffle configuration of the present disclosure allows the burners 106 to remain seated low in the firebox 102, nearer to the floor 103B. In other words, the burners 106 do not have to be elevated from their normal position to allow a wall or walls to pass thereunder.

Above one or more of the burners 106 may be placed an associated diffuser 112. The diffusers may be affixed to the firebox 102 or to the cooking grate 104. The diffusers 112 may be inverted V-shapes and may also be provided with openings or perforations. The diffusers 112 need not necessarily stop or interrupt convective gas flow but are intended to ensure even heating of the cooking grate in the respective zone by the burner 106 below. The diffusers 112 may be constructed of a suitably heat resistant sheet metal or other material.

Figure 3A:
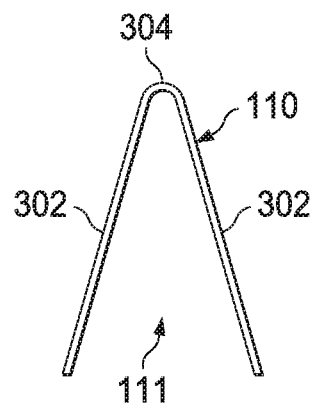
FIG. 3A is a close up frontal cutaway view of a baffle for use in a grill according to aspects of the present disclosure.
Figure 3B:
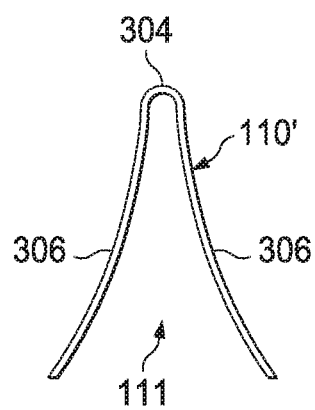
FIG. 3B is a close up frontal cutaway view of another baffle for use in a grill according to aspects of the present disclosure.
Figure 3C:
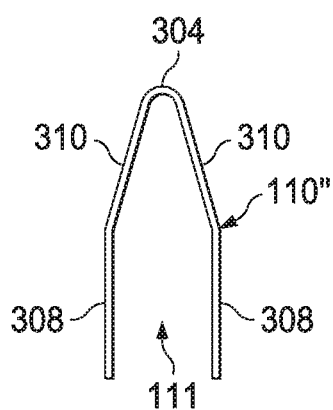
FIG. 3C is a close up frontal cutaway view of a third baffle for use in a grill according to aspects of the present disclosure.

Referring now to FIG. 3A, a close up frontal cutaway view of the baffle 110 is shown. Here it can be seen that two relatively straight sidewalls 302 meet at a vertex or apex 304 forming an inverted V shape. The apex 304 may be sharply pointed or slightly rounded as shown. Referring now also to FIG. 3B a close up frontal cutaway view of another baffle 110' for use in a grill according to aspects of the present disclosure is shown. The baffle 110' has slightly radiused or concave walls 306 joining at the apex 304 (which may be radiused or sharply angled as before). In other embodiments, convex walls (not shown) may be utilized. FIG. 3C is a close up frontal cutaway view of a third baffle 110" for use in a grill according to aspects of the present disclosure. Here the walls each comprise a vertical section 308 transitioning into an angled section 310. Here, both the vertical section 308 and the angled section 310 are relatively straight. The angled sections 310 join at a smoothly radiused or sharply pointed apex 304.

Each of the various baffle types (110, 110', 110") may be used with the grills of the present disclosure. They may also be used alongside one another (i.e., more than one type of baffle may be used in a single grill). Each of these preserves the zonal performance and provides a protected zone 111 for the carryover tube flame to effect re-ignition of a blown out burner.

Figure 4A:
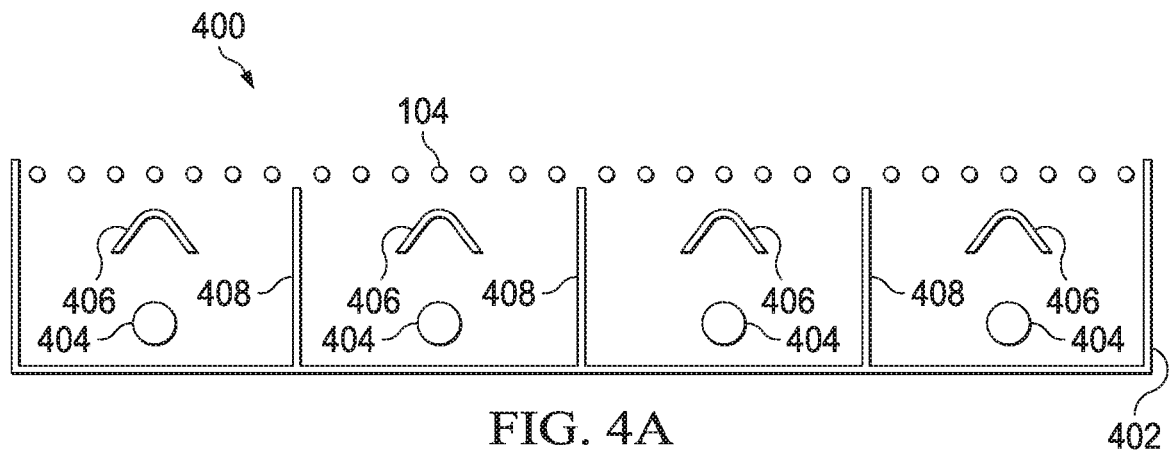
FIG. 4A is a frontal cutaway view of a grill with divider sheets between burners.
Figure 4B:
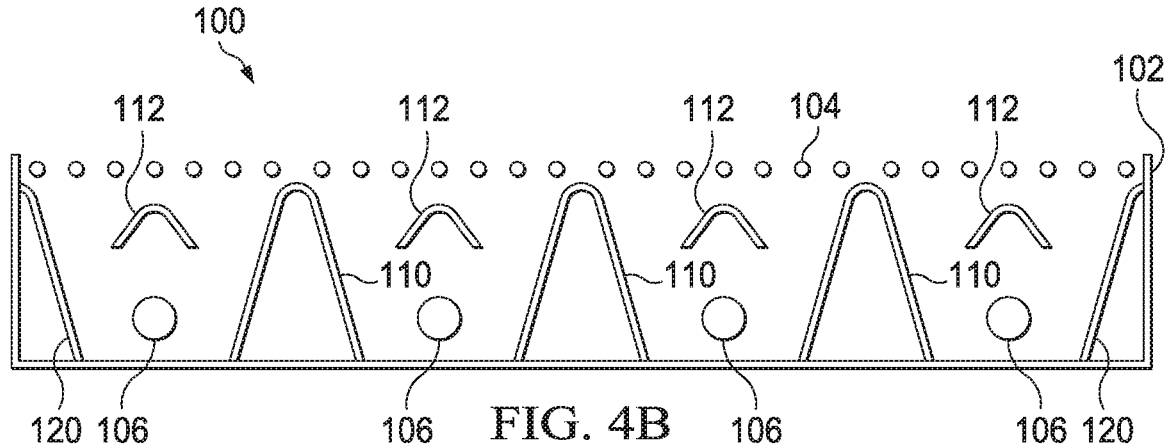
FIG. 4B is a simplified front cutaway view of a grill with baffles between the burners according to the present disclosure.

Referring now to FIG. 4A a frontal cutaway view of a grill 400 with divider sheets 408 between burners 404 is shown. FIG. 4B is a simplified front cutaway view of a grill 100 with baffles 110 between the burners 106 according to the present disclosure. The simple divider sheets 408 of the grill 400 do not provide a refuge for the carryover tube (108, FIGS. 1-2). Moreover the sheet dividers 408 do very little to aid in zonal heating (that is, isolating the amount of heat reaching one zone or another) due to rapid thermal transfer across the single sheet divider.

The grill 100, on the other hand, in addition to providing protection for the carryover tube 108 provides much greater thermal isolation of the various zones because of the air trapped within the baffles 110. It can also be seen that half baffles 120 may be constructed adjacent the ends of the firebox 102 to enhance thermal isolation of the end-most zones from heat loss through the firebox. The half baffles 120 may also have similar construction options of the baffles 110, 110', 110" (e.g., wall and apex shape).

Figure 5A:
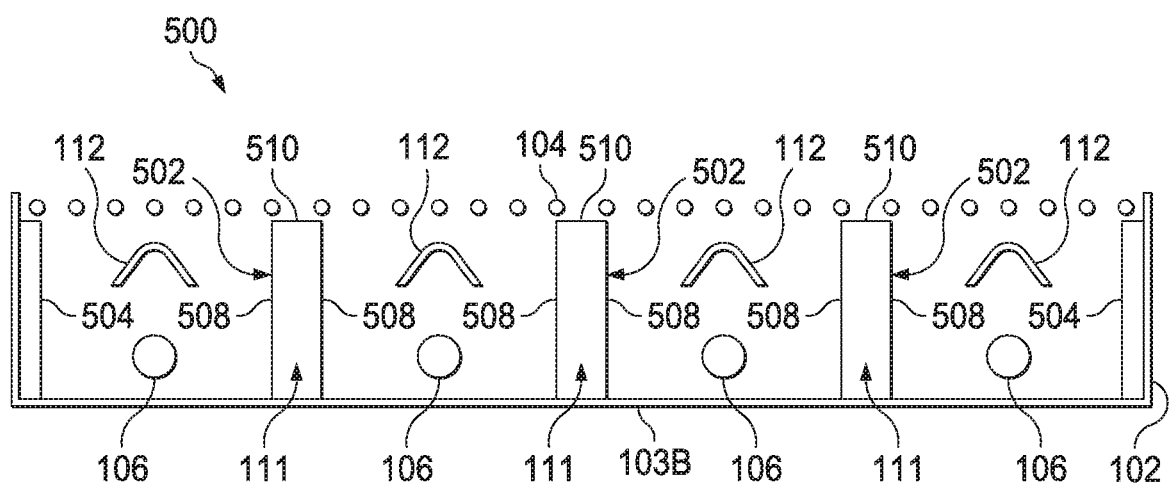
FIG. 5A is a simplified front cutaway view of a grill with a fourth type of baffle between the burners according to the present disclosure.
Figure 5B:
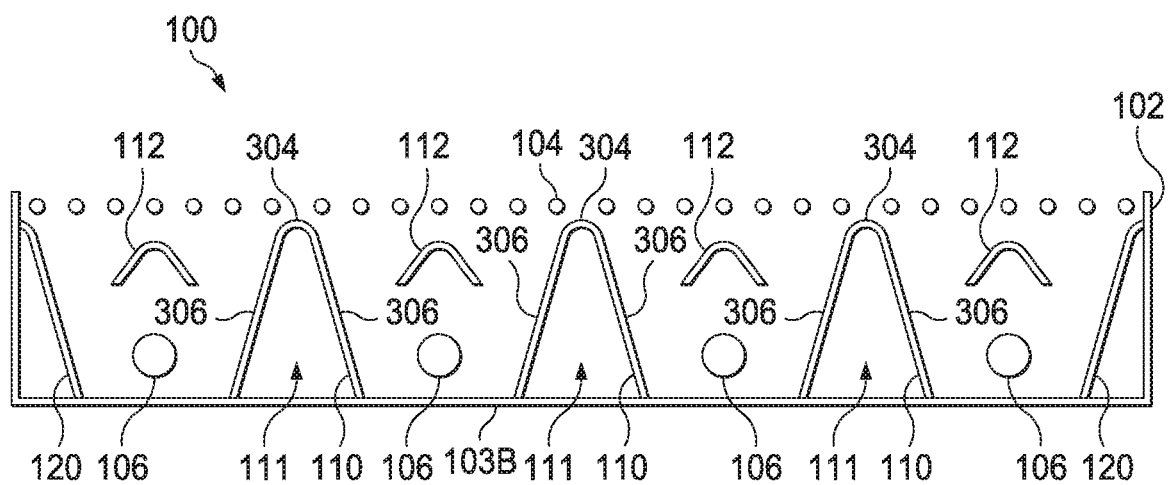
FIG. 5B reproduces the simplified view of FIG. 4B for comparison with FIG. 5A.

Referring now to FIG. 5A a simplified front cutaway view of a grill 500 with a fourth type of baffle 502 between the burners is shown. FIG. 5B reproduces the simplified view of FIG. 4B for comparison with FIG. 5A. The baffles 502 comprise two upright spaced apart walls 508 joined by a top cover 510. The baffles 502 provide some protective space for a carryover tube (e.g., 108, FIGS. 1-2) to pass. The baffles 502 also provide enhanced thermal isolation between cooking zones but reduce the amount of effective cooking area on the grate 104 since the walls 508 of baffles 502 do not join at an apex. Half baffles 504 can also be placed at the end portions of the firebox 102 to provide increased thermal isolation.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cooking grill comprising:
   a cooking grate;
   a plurality of gas burners arranged adjacent to one another below the cooking grate near a floor of a firebox supporting the cooking grate; and
   at least one baffle between adjacent ones of the plurality of gas burners having an apex proximate the cooking grate and having a pair of opposite spaced apart walls extending downwardly at least to a level below a level of the plurality of gas burners;
   at least one carryover tube passing through the at least one baffle to operationally connect the adjacent ones of the plurality of gas burners;
   wherein the at least one baffle defines a pair of openings in a lower portion of the opposite spaced apart sidewalls through which the at least one carry over tube passes.

2. The cooking grill of claim 1, wherein the at least one baffle extends to a floor of a firebox containing the gas burners and supporting the cooking grate.

3. The cooking grill of claim 1, wherein the at least one baffle defines a plurality of independent cooking zones on the cooking grate, the plurality of zones being demarcated by the apex of the at least one baffle and each cooking zone being substantially functionally isolated from heat produced by a burner associated with the adjacent zone.

4. The cooking grill of claim 1, wherein a plurality of baffles define a plurality of independent cooking zones on the cooking grate, the plurality of zones being demarcated by the apices of the plurality of baffles, and each cooking zone being substantially functionally isolated from heat produced by a burner associated with the adjacent zone.

5. The cooking grill of claim 1, wherein the at least one baffle is arranged to run front to back below the cooking grate such that the cooking grate is divided into cooking zones that are arranged side by side on the cooking grate.

6. The cooking grill of claim 1, wherein the plurality of burners comprise a plurality of tubular burners running front to back below the cooking grate.

7. The cooking grill of claim 6, wherein a diffuser is positioned over one of the plurality of burners to spread convective heat across the cooking grate.

8. The cooking grill of claim 7, wherein the diffuser comprises a perforated plate having an inverted-V cross section.

9. A cooking grill comprising:
   a firebox having a plurality of burner tubes oriented front-to-back near a floor of the firebox;
   a cooking grate supported above the burner tubes;
   at least one thermally isolating baffle between a pair of adjacent burner tubes running front-to-back within the firebox and extending from a lower lever that is at least as low as the adjacent pair of burner tubes to an upper level proximate the cooking grate;
   a passage defined through the at least one thermally isolating baffle in a lower portion of the thermally isolating baffle;
   a carryover tube connecting the pair of adjacent burners and providing for flame carryover therebetween, the carryover tube passing through the passage defined through the at least one thermally isolating baffle.

10. The cooking grill of claim 9, wherein the at least one thermally isolating baffle extends to a floor of the firebox below the plurality of burner tubes.

11. The cooking grill of claim 10, wherein the baffle comprises a panel having an inverted-V shape with an apex proximate the cooking grate and spaced apart legs extending below the plurality of burner tubes.

12. The cooking grill of claim 11, wherein the baffle comprises a pair of radiused sidewalls joining at a vertex proximate the cooking grate and extending apart below the plurality of burner tubes.

13. The cooking grill of claim 11, wherein the baffle comprises a pair of vertical, spaced apart side walls extended to the firebox below the burner tubes and an upper inverted-V section with an apex proximate the cooking grate.

14. The cooking grill of claim 9, further comprising a plurality of diffusers running front to back above one of the plurality of burner tubes, respectively.

15. A method comprising:
    providing a cooking grill having a firebox and a cooking grate situated proximate a top of the firebox;
    providing a plurality of tubular gas burners near a floor of the firebox;
    providing a thermally isolating baffle between two adjacent ones of the plurality of tubular gas burners;
    defining a passageway through the thermally isolating baffle in a lower sidewall of the baffle proximate the floor of the firebox; and
    providing a carryover tube passing through the passageway to transport flame between the two adjacent gas burners.

16. The method of claim 15, further comprising forming the thermally isolating baffle as a pair of spaced apart walls.

17. The method of claim 16, further comprising arranging the thermally isolating baffle to extend from below the plurality of tubular gas burners to proximate the cooking grate.

18. The method of claim 17, further comprising forming the thermally isolating baffle as an inverted V with an apex proximate the cooking grate.

19. The method of claim 18, further comprising providing a diffuser below the cooking grate and above one of the plurality of tubular gas burners.

* * * * *